(12) United States Patent
Takimoto

(10) Patent No.: US 7,828,319 B2
(45) Date of Patent: Nov. 9, 2010

(54) AIRBAG FOR PEDESTRIAN AND AIRBAG APPARATUS FOR PEDESTRIAN

(75) Inventor: Takayuki Takimoto, Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 12/091,761

(22) PCT Filed: Nov. 14, 2006

(86) PCT No.: PCT/JP2006/322601

§ 371 (c)(1),
(2), (4) Date: Apr. 28, 2008

(87) PCT Pub. No.: WO2007/063697

PCT Pub. Date: Jun. 7, 2007

(65) Prior Publication Data

US 2009/0120708 A1    May 14, 2009

(30) Foreign Application Priority Data

Nov. 30, 2005   (JP)   ............... 2005-346311

(51) Int. Cl.
*B60R 21/16*  (2006.01)
(52) U.S. Cl. .................... 280/730.1; 180/274
(58) Field of Classification Search .............. 280/730.1; 180/274
See application file for complete search history.

(56) References Cited

U.S. PATENT DOCUMENTS

| 6,182,782 | B1 | 2/2001 | Matsuura et al. |
| 6,932,386 | B2 | 8/2005 | Ikeda et al. |
| 2003/0075373 | A1 | 4/2003 | Sawa et al. |

FOREIGN PATENT DOCUMENTS

| JP | 2000-118337 A | 4/2000 |
| JP | 2003 11754 | 1/2003 |
| JP | 2003 320920 | 11/2003 |
| JP | 2003 327064 | 11/2003 |
| JP | 2003 341464 | 12/2003 |
| JP | 2004 34765 | 2/2004 |

OTHER PUBLICATIONS

An International Search Report dated Feb. 13, 2007, from the International Bureau in corresponding International (PCT) Application No. PCT/JP2006/322601.

*Primary Examiner*—Eric Culbreth
(74) *Attorney, Agent, or Firm*—Fitch, Even, Tabin & Flannery

(57) ABSTRACT

An airbag is disclosed, in which at least a part of the inside thereof is partitioned into cells. In one form, an airbag apparatus for a pedestrian includes a case for housing a folded airbag, an inflator for inflating the airbag, and a lid that closes an opening of a hood, the opening allowing the airbag to pass through. The inside of the airbag is partitioned by linear stitched portions and. A gas blowing portion of the inflator is disposed to correspond to the stitched portion.

6 Claims, 3 Drawing Sheets

… (1/2)

AIRBAG FOR PEDESTRIAN AND AIRBAG APPARATUS FOR PEDESTRIAN

TECHNICAL FIELD

The present invention relates to an airbag apparatus for a pedestrian and its airbag that prevent a pedestrian, an occupant of a bicycle, or an occupant of a motorcycle (hereinafter, collectively referred to as a pedestrian) from directly hitting against a highly rigid portion such as a pillar of a vehicle body, when an automobile collides with the pedestrian, bicycle, or motorcycle during driving.

BACKGROUND ART

When an automobile during driving collides with a pedestrian, a bicycle, a motorcycle, or the like, a lower body of the stricken pedestrian or the like is flapped by a front portion of a vehicle body of the automobile, and a head portion or an upper body of the pedestrian may have a secondary collision with a highly rigid portion such as a pillar or the like.

Japanese Unexamined Patent Application Publication No. 2003-327064 describes an airbag apparatus for protecting a pedestrian, in which the pedestrian is prevented from directly hitting against a portion around a cowl top and an A-pillar, by inflating an airbag along the cowl top and left and right A-pillars of an automobile, when the automobile collides with the pedestrian.

The airbag described in Japanese Unexamined Patent Application Publication No. 2003-327064 has a structure in which a plurality of cylindrical airbags are connected in a raft-like manner and communicate with each other so as to widely cover the outer surface of a vehicle body; however, the document does not specifically disclose how an airbag base cloth (panel) is stitched to form the raft-like airbag structure.

DISCLOSURE OF INVENTION

An object of the present invention is to easily manufacture an airbag, at least a part of the inside of which is partitioned into cells (small chambers).

An airbag for a pedestrian according to a first aspect of the present invention is deployed along an outer surface of a vehicle body with inflation gas from an inflator. The airbag includes a lower panel located on a vehicle body side, and an upper panel located opposite to the lower panel. The inside of the airbag is partitioned into a plurality of cells by a stitched portion formed by partially stitching the upper panel and the lower panel.

The airbag may include a cowl covering portion being deployed along a cowl portion and a lower part of a windshield of a vehicle, and an A-pillar covering portion communicating with the cowl covering portion and being deployed along an A-pillar of the vehicle. The cells may be provided at least in the cowl covering portion.

An airbag apparatus for a pedestrian according to a second aspect of the present invention includes the airbag for the pedestrian described in the first aspect, and an inflator for inflating the airbag for the pedestrian.

The stitched portion may extend substantially straight, and the inflator may be disposed such that a gas blowing portion thereof is disposed to correspond to a middle portion of the stitched portion in a longitudinal direction.

DETAILED DESCRIPTION

In the airbag for the pedestrian and the airbag apparatus for the pedestrian of the present invention, a plurality of cells are formed in the airbag by the stitched portion where the upper panel and the lower panel are stitched together. As a result, the airbag including the cells can be easily formed.

In the case where the airbag has the cowl covering portion and the A-pillar covering portion, it is preferable to provide the cells with the stitched portion at least in the cowl covering portion that has a large deployment area (area for covering the outer surface of the vehicle body).

In the case where the stitched portion extends substantially straight, it is preferable to dispose the gas blowing portion of the inflator to correspond to the middle portion of the stitched portion in the longitudinal direction. Accordingly, a stress can be prevented from excessively concentrating at an end of the stitched portion when the airbag is inflated.

Figure 1:
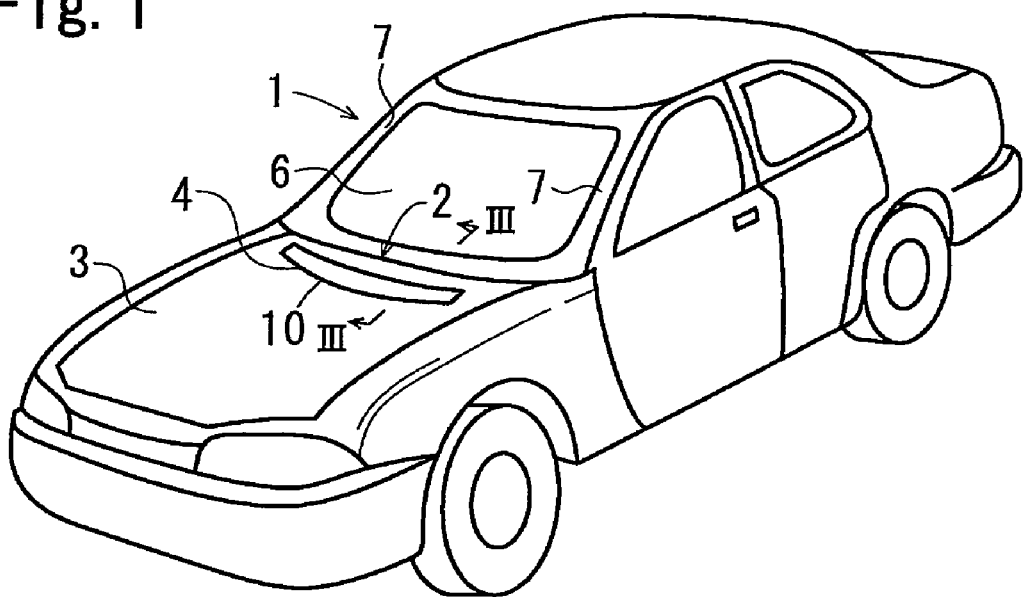
FIG. 1 is a perspective view showing an automobile having an airbag apparatus for a pedestrian according to an embodiment.
Figure 2:
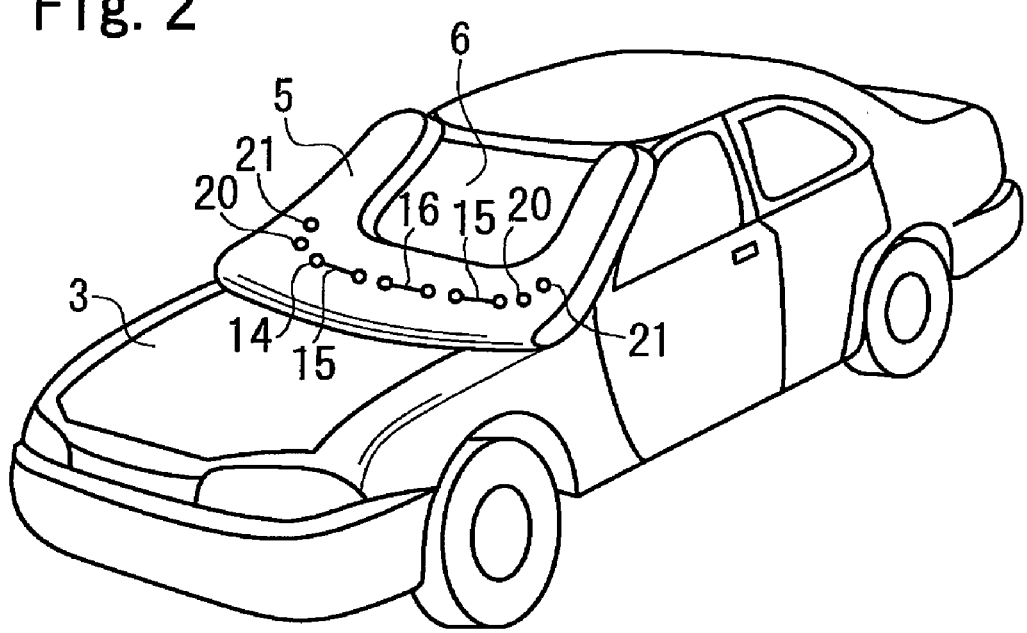
FIG. 2 is a perspective view showing the automobile in FIG. 1 when an airbag is inflated.

Hereinafter, an embodiment will be explained with reference to the drawings. FIG. 1 is a perspective view showing an automobile having an airbag apparatus for a pedestrian according to the embodiment, FIG. 2 is a perspective view of the automobile in FIG. 1 when the airbag is inflated, FIG. 3 is a cross section taken along the line III-III in FIG. 1, FIG. 4 is a perspective view partially showing the inflated airbag, and FIGS. 5 through 8 are cross sections respectively taken along the line V-V through VIII-VIII in FIG. 4.

As shown in FIG. 1, an automobile 1 is a four-door sedan, however, the application of the present invention is not limited to a specific type of vehicles. An airbag apparatus 4 for a pedestrian is installed at a rear portion of a hood 3. As shown in FIG. 2, when an airbag 5 of the airbag apparatus 4 for the pedestrian is inflated, a cowl top 2, a windshield 6, and left and right A-pillars 7 are covered with the airbag 5.

Figure 3:
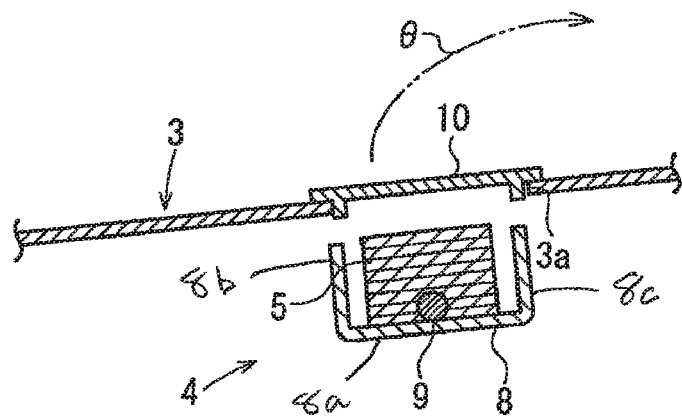
FIG. 3 is a cross section taken along a line in FIG. 1.
Figure 4:
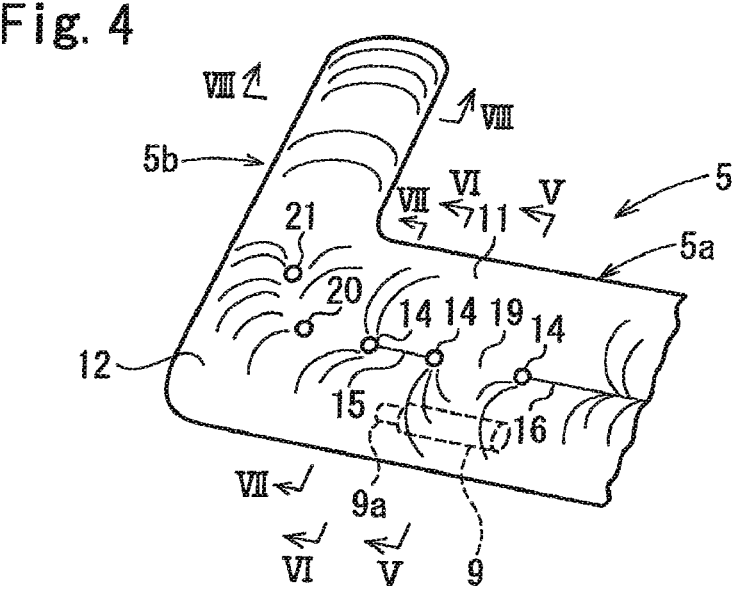
FIG. 4 is a perspective view partially showing the inflated airbag.
Figure 5:
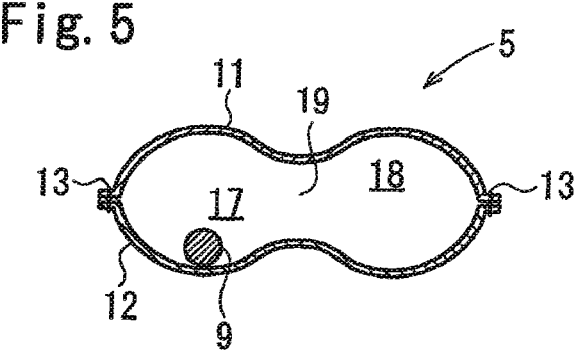
FIG. 5 is a cross section taken along a line V-V in FIG. 4.
Figure 6:
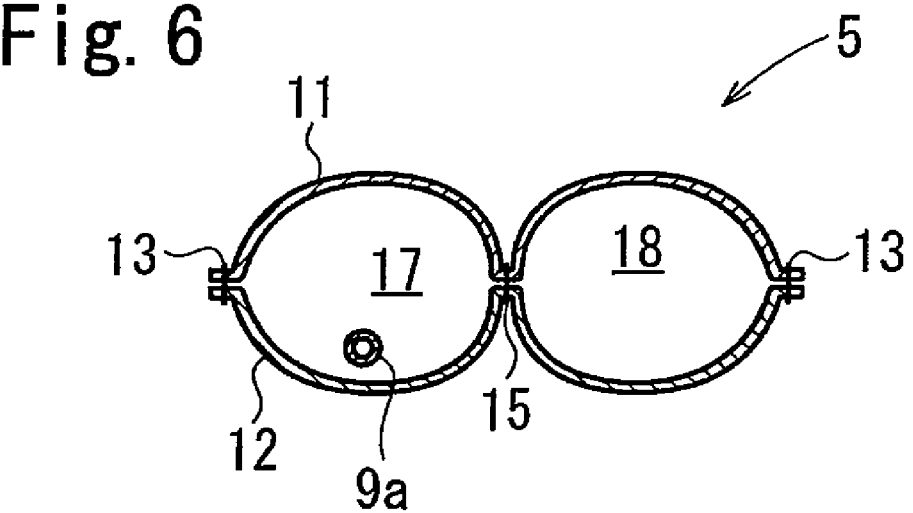
FIG. 6 is a cross section taken along a line VI-VI in FIG. 4.
Figure 7:
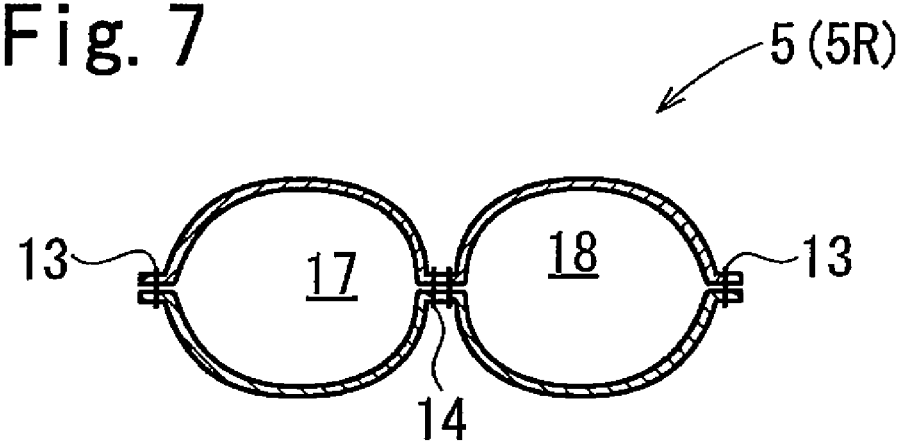
FIG. 7 is a cross section taken along a line VII-VII in FIG. 4.
Figure 8:
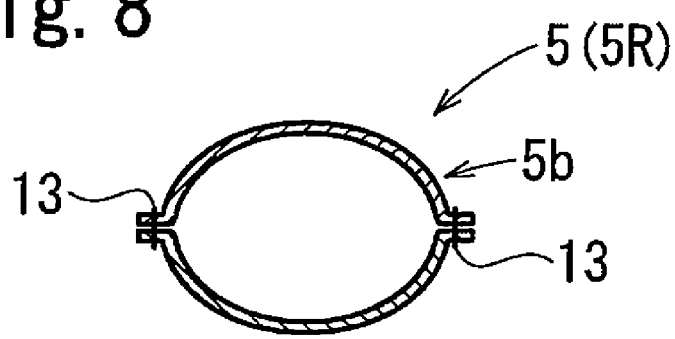
FIG. 8 is a cross section taken along a line VIII-VIII in FIG. 4.

As shown in FIG. 3, the airbag apparatus 4 for the pedestrian includes a case 8 for housing the folded airbag 5, an inflator 9 for inflating the airbag 5, and a lid 10 for closing an opening 3a of the hood 3, the opening 3a allowing the airbag 5 to pass through.

The case 8 has a long-box shape extending in a width direction of a vehicle body. The case 8 contains a bottom portion 8a, a front wall portion 8b, and a rear wall portion 8c. An upper portion of the case 8 is opened.

In this embodiment, the folded airbag 5 extends from the right end to the left end of the case 8. A base end portion of the airbag 5 is fixed to the case 8. In addition, the inflator 9 is disposed in the case 8 and fixed to the case 8. Alternatively, an inflator may be disposed outside the case 8 and gas may be introduced into an airbag using a duct or the like.

An edge of the lid 10 located near the rear of the vehicle body is fastened to a rear edge of the opening 3a of the hood 3 with a hinge (not shown). When the airbag 5 is inflated, the lid 10 is opened as being turned toward the rear of the vehicle body as indicated by an arrow θ in FIG. 3. A front edge of the lid 10 is engaged to a front edge of the opening 3a using, for example, engagement means (not shown), such as a clip. The engagement means releases the engagement when the lid 10 is pushed and opened by the airbag 5.

A structure of the airbag 5 will be explained next, referring to FIGS. 4 through 8.

The airbag 5 is formed into a bag-like shape by superposing an upper panel 11 on a lower panel 12, and stitching their peripheral edges together, with a peripheral edge stitched portion 13.

The airbag 5 has a substantially U-shape and including a cowl covering portion 5a that covers a cowl 2 and a lower part of the windshield 6, and pillar covering portions 5b and 5b that respectively communicate with both left and right ends of the cowl covering portion 5a and are deployed along the left and right A-pillars 7 to respectively cover the A-pillars 7. However, the deployment configuration of an airbag is not limited to one described above. For example, the airbag 5 may have a substantially rectangular shape to entirely cover the cowl, windshield, and A-pillars, or may have a substantially H-shape as shown in FIG. 9, which will be described later.

The upper panel 11 and the lower panel 12 of the airbag 5 are coupled by circular stitched portions 14 and linear stitched portions 15 and 16 located substantially at the center of the panels 11 and 12 in the cowl covering portion 5a. The linear stitched portions 15 and 16 extend in a width direction of the vehicle body at an intermediate portion of the cowl covering portion 5a. The stitched portions 15 and 16 are disposed substantially along a line.

The inside of the cowl covering portion 5a of the airbag 5 is partitioned into a chamber 17 located near the front of the vehicle body, and a chamber 18 located near the rear of the vehicle body, with respect to the linear stitched portions 15 and 16.

The circular stitched portions 14 are disposed at ends of the linear stitched portions 15 and 16. The panels 11 and 12 are not stitched together at a portion between the linear stitched portions 15 and 16. Such a portion defines a communication portion 19 where the chambers 17 and 18 communicate with each other. The panels 11 and 12 are coupled together by circular stitched portions 20 and 21 that are spaced apart from the linear stitched portion 15 so as to regulate the thickness of the airbag 5 when being inflated. The inflator 9 is disposed in the chamber 17. In this embodiment, the inflator 9 has a cylindrical shape, and is configured to blow gas in a radial direction from a gas blowing portion 9a provided at an end thereof. The cylindrical inflator 9 is disposed such that its axial direction becomes parallel to the linear stitched portion 15. The gas blowing portion 9a is disposed to correspond to a middle portion of the linear stitched portion 15 in a longitudinal direction. In particular, the gas blowing portion 9a is positioned near the front of the vehicle body at a substantially middle portion of the linear stitched portion 15 in the longitudinal direction.

In a case where a pedestrian or the like collides with an automobile having the above-described airbag apparatus 4 for the pedestrian, the inflator 9 is activated on the basis of a detection signal from a pedestrian collision sensor (not shown), and the airbag 5 starts to be inflated with the blowing gas. The lid 10 is pushed and opened by the inflated airbag 5, and the airbag 5 is deployed along the outer surface of the vehicle body, as shown in FIG. 2.

In this embodiment, the upper panel 11 and the lower panel 12 are coupled together by the circular stitched portions 14, 20, and 21, and the linear stitched portions 15 and 16, to control the thickness of the airbag 5 when being inflated, and to define the chambers 17 and 18. Accordingly, the structure of the airbag 5 is simplified.

In this embodiment, the gas blowing portion 9a of the inflator 9 is disposed to correspond to the middle portion of the linear stitched portion 15. Hence, even if force exerted to the panels 11 and 12 to separate the panels 11 and 12 due to the blowing gas pressure of the inflator 9 increases at the intermediate portion of the linear stitched portion 15, the gas pressure can be prevented from concentrating on both ends of the linear stitched portion 15. As a result, coupling between the panels 11 and 12 can be maintained at the ends of the linear stitched portion 15, as well as at the ends of the linear stitched portions 16.

Since the circular stitched portions 14 are provided at the ends of the linear stitched portions 15 and 16, coupling between the panels 11 and 12 can become extremely firm.

While the airbag 5 has the substantially U-shaped deployment configuration in which the pair of the pillar covering portions 5b and 5b for covering the left and right A-pillars of the vehicle body extend respectively from both left and right ends of the cowl covering portion 5a in the embodiment shown in FIGS. 1 through 7, the configuration of the airbag of the present invention is not limited to the above-described configuration, as mentioned above. Another embodiment can be provided in which an airbag has a substantially H-shaped deployment configuration, in which a pair of pillar covering portions that extend from both left and right ends of a cowl covering portion to cover the left and right A-pillars of the vehicle body, and a pair of fender covering portions that extend to cover left and right fender portions.

The above-described embodiments are merely examples of the present invention, and the present invention may include other embodiments which are not illustrated.

This application is based on Japanese Patent Application (No. 2005-346311) filed Nov. 30, 2005, which is hereby incorporated by reference herein in its entirety.

The invention claimed is:

1. An airbag apparatus for an automobile to provide protection for a pedestrian, the airbag apparatus comprising:
   an airbag for being deployed along an external surface of the automobile;
   an inflator for supplying the airbag with inflation gas upon collision of the automobile with a pedestrian with the inflator extending longitudinally in the airbag;
   upper and lower panels of the airbag connected at respective peripheral edges thereof to form an internal space of the airbag;
   an elongate portion of the airbag for extending longitudinally along the automobile external surface upon airbag inflation;
   a linear stitched portion of the airbag elongate portion that extends longitudinally generally parallel to the longitudinally extending inflator and connects the airbag upper and lower panels together with the linear stitched portion having opposite ends and a middle centrally therebetween;
   circular stitched portions at the ends of the linear stitched portion that connect the airbag upper and lower panels together;
   chambers in the airbag internal space formed on either side of the linear stitched portion; and an outlet portion of the inflator arranged in one of the chambers in the airbag interior space so that a terminal end thereof is aligned with the middle of the linear stitched portion centrally between the circular stitched portions at the ends of the linear stitched portion to minimize stress concentration on the circular stitched portions at the ends of the linear stitched portion by the inflation gas emitted radially out from the inflator outlet portion.

2. The airbag apparatus of claim 1 wherein the inflator and outlet portion thereof have a cylindrical configuration and generally extend parallel to the linear stitch portion with inflation gas being emitted in a radial direction out from the cylindrical inflator outlet portion.

3. The airbag apparatus of claim 1 wherein the airbag generally has a U-shape with the airbag elongate portion sized to cover a cowl and lower windshield portion of an automobile, and a pair of pillar covering portions of the airbag with one pillar covering portion extending from each end of the airbag elongate portion up along respective pillars on either side of the windshield of the automobile.

4. The airbag apparatus of claim 1 including another linear stitched portion having opposite ends, and circular stitched portions at the ends of the other linear stitched portion with the linear stitched portions being aligned with and spaced from each other so that there is a gap therebetween.

5. The airbag apparatus of claim 4 wherein the inflator has a cylindrical body including opposite ends with the outlet portion being at only one of the ends of the inflator body aligned with the middle of the linear stitched portion.

6. The airbag apparatus of claim 5 wherein the inflator body is sized to span the gap between the linear stitched portions so that the opposite end of the inflator body is closed and is aligned with one of the circular stitched portions of the other linear stitched portion.

* * * * *